Figure 1:
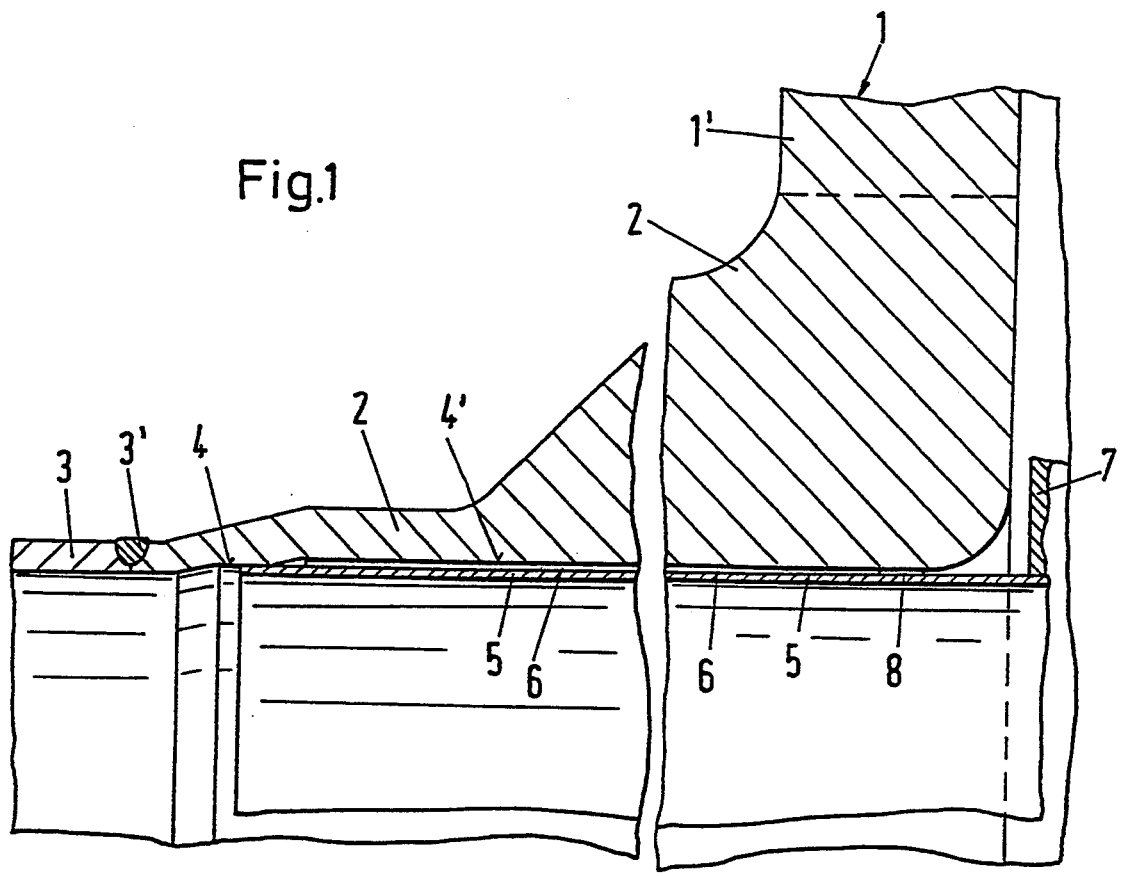

United States Patent [19]

Blumer

[11] Patent Number: 5,392,323
[45] Date of Patent: Feb. 21, 1995

[54] REACTOR PRESSURE VESSEL IN A NUCLEAR POWER STATION

[75] Inventor: Urs Blumer, Winterthur, Switzerland

[73] Assignee: Sulzer Thermtec AG, Winterthur, Switzerland

[21] Appl. No.: 230,669

[22] Filed: Apr. 21, 1994

[30] Foreign Application Priority Data

Jun. 14, 1993 [EP]  European Pat. Off. ........... 93810424

[51] Int. Cl.⁶ .......................................... G21C 13/032
[52] U.S. Cl. .................................... 376/291; 376/286
[58] Field of Search ............... 376/204, 285, 286, 291, 376/292; 285/47, 48, 54; 138/148, 149

[56] References Cited

U.S. PATENT DOCUMENTS

| | | | |
|---|---|---|---|
| 4,081,325 | 3/1978 | Aubert et al. | 376/286 |
| 4,834,935 | 5/1989 | Daigle | 376/292 |
| 4,844,274 | 7/1989 | Sterk | 376/291 |
| 5,047,201 | 9/1991 | Schmidt et al. | 376/291 |

FOREIGN PATENT DOCUMENTS 0293721  12/1988  European Pat. Off. .
2634271   1/1990  France .

*Primary Examiner*—Daniel D. Wasil
*Attorney, Agent, or Firm*—Townsend and Townsend Khourie and Crew

[57] ABSTRACT

The reactor pressure vessel comprises a pipe socket (2) connected to a feed-water supply line (3), in which is disposed a coaxial protective sleeve (5) (thermal sleeve) which expands with changes in temperature. With its outer end the protective sleeve (5) slidably abuts the pipe socket (2) and with its inner end it is connected to a feed-water distributing ring situated in the vessel. A pipe section (10), in which bellows (15) are disposed, is inserted between the outer end of the pipe socket (2) and the feed-water supply line (3). With one end the bellows (15) are tightly connected to the outer end of the protective sleeve (5) and with their other end they are tightly connected to the pipe section (10).

3 Claims, 1 Drawing Sheet

REACTOR PRESSURE VESSEL IN A NUCLEAR POWER STATION

The invention relates to a reactor pressure vessel in a nuclear power station, having at least one pipe socket connected to a feed-water supply line, in which a coaxial protective sleeve (thermal sleeve) expanding with changes in temperature is disposed, which with its outer end slidably abuts the pipe socket and with its inner end is connected to a feed-water distributing ring situated in the pressure vessel.

In reactor pressure vessels of this type cold feed-water is conveyed via the feed-water supply line into the distributing ring, from which it then overflows into hot reactor water, which is situated in the remaining space of the vessel. Between the end of the protective sleeve slidably abutting the pipe socket and the pipe socket, cold feed-water can overflow into an annular gap which is situated between the protective sleeve and the pipe socket and is filled with hot reactor water. By the coming together of hot reactor water and cold feed-water in this annular gap, thermal stresses can be produced in the pipe socket, which then may result in cracks in the material of the pipe socket. With regard to the regulations on the safety of the reactor, such cracks should be avoided.

The object of the invention is to improve the reactor pressure vessel of the type mentioned at the beginning so that cracking in the pipe socket is safely avoided.

This object is achieved in accordance with the invention in that a pipe section is inserted between the outer end of the pipe socket and the feed-water supply line and in that in the pipe section are disposed bellows, which with one end are tightly connected to the outer end of the expanding protective sleeve and with their other end are tightly connected to the pipe section.

By the arrangement of the bellows in the pipe section and the tight connection of the bellows to the pipe section and the expanding protective sleeve it is ensured that the protective sleeve can freely expand in the pipe socket under the affect of temperature changes, whereby the bellows also experience these expansion movements, but that cold feedwater is prevented from overflowing into the annular gap filled with hot reactor water. Therefore no periodic changes in the water temperature can occur in the annular gap, so that thus surface temperature changes in the pipe socket are avoided. The occurrence of cracking in the material of the pipe socket is thus prevented.

An exemplified embodiment of the invention is explained in the following description by means of the drawings.

Figure 2:
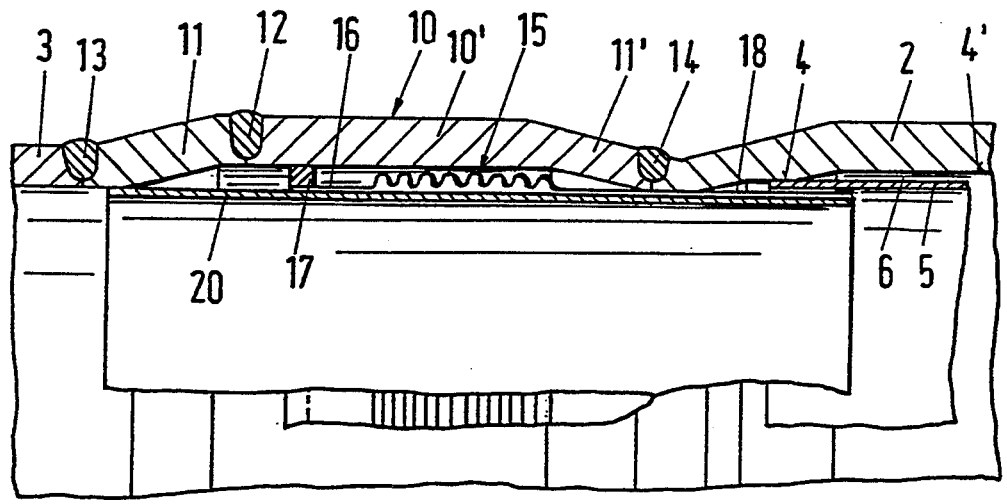

FIG. 1 shows a vertical section through a part of the reactor pressure vessel, the pipe socket and the feed-water supply line in accordance with the prior art and FIG. 2 shows a vertical section through a part of the pipe socket and the supply line with the arrangement according to the invention.

As shown in FIG. 1, a cylindrical reactor pressure vessel 1 of a nuclear reactor plant is provided with a pipe socket 2, which is welded in a known manner into the vessel wall 1'. The left-hand end of the pipe socket 2 in FIG. 1 is connected to a feed-water supply line 3, e.g. by a weld 3', whereby the internal and external diameters of the line 3 and of the end of the pipe socket 2 are substantially the same. Outside the region of this connection the pipe socket 2 is widened slightly on its inside and then passes into a cylindrical face 4, which the outer end of a protective sleeve 5 slidably abuts, which sleeve extends through the pipe socket 2 towards the interior of the vessel. During the operation of the reactor pressure vessel 1, the protective sleeve 5 is subject to temperature changes, and for this reason the term "thermal sleeve" is also used for the protective sleeve. Towards the interior of the vessel next to the cylindrical face 4 in the pipe socket 2 there is also a widened portion, which then passes into a cylindrical face 4, so that an annular gap 6 remains between the protective sleeve 5 and the pipe socket 2. The end of the protective sleeve 5 protruding into the interior of the vessel passes into a feed-water distributing ring 7 (not shown in further detail), which in the vessel 1 extends along the vessel perimeter. Close to the inner end of the pipe socket 2 the outer side of the protective sleeve 5 is provided with cams 8, which extend through the annular gap 6 and centre the protective sleeve in the socket bore.

During the operation of the reactor pressure vessel 1, cold feed-water is supplied via the feed-water supply line 3 and the protective sleeve 5 to the distributing ring 7, from which the feed-water overflows into the interior of the pressure vessel. The interior of the pressure vessel is otherwise filled with hot reactor water, which is also situated in the annular gap 6. As the narrow gap between the outer end of the protective sleeve 5 and the cylindrical face 4 is not tight, cold feed-water also enters the annular gap 6. Thermal stresses, which can result in cracks in the material of the pipe socket, may occur in the pipe socket 2 by the meeting of cold and hot water in the annular gap 6.

As shown in FIG. 2, between the outer end of the pipe socket 2 and the feed-water supply line 3 is inserted a pipe section 10, which is widened in its central part 10' in comparison with the internal and external diameters of line 3 and the socket end. The two ends of this widened part 10' pass into a hollow conical part 11 and 11', which are tightly connected to the line 3 and the end of the pipe socket 2 respectively, e.g. by welds 13 and 14. For reasons relating to production technology, a weld joint seam 12 is also provided between the hollow conical part 11 and the central part 10'. In the widened part 10' are disposed bellows 15, which at their left-hand end in FIG. 2 comprise a cylindrical pipe section 16, the diameter of which roughly corresponds to the internal diameter of the bellows. The left-hand end in FIG. 2 of the pipe section 16 is tightly connected to a ring 17, which is welded into the central part 10' and bridges the space between pipe section 16 and the internal diameter of the central part 10'. A pipe section 18 corresponding to the cylindrical pipe section 16 is provided at the right-hand end in FIG. 2 of the bellows 15, which extend over the pipe section 10 into the protective sleeve 5. The pipe section 18 is tightly connected on its inside to the protective sleeve 5, e.g. by welding.

In this manner it is possible that the protective sleeve 5—as before—can expand in the pipe socket 2 under the affect of temperature changes and that at the same time cold feed-water is prevented from overflowing into the annular gap 6, because the bellows 15 also experience the thermal expansion, but are tightly connected to the pipe section 10 and the protective sleeve 5.

For reasons relating to flow technology, in the bellows 15 is disposed a pipe 20, the external diameter of which corresponds to the internal diameter of the hollow conical part 11 in the region of the weld 13. The pipe 20 is tightly connected to the hollow conical part 11 at its tapered end and extends to the end of the cylindrical pipe section 18 of the bellows 15 situated in the protective sleeve 5. The right-hand end of the pipe 20 in FIG. 2 abuts the pipe section 18 and is connected thereto in a nonsecure manner. Thus the pipe 20 can freely expand, and therefore is also a thermal sleeve.

Deviating from the described exemplified embodiment shown in FIG. 2, the pipe section 10 may have the same diameter measurements as the feed-water line 3 and pipe socket 2. In such a case the bellows 15 protrude slightly into the cross section of flow. The pipe 20, which is provided in appropriate circumstances, could then be expanded at its left-hand end in FIG. 2.

What is claimed is:

1. A reactor pressure vessel of a nuclear power station, having at least one pipe socket connected to a feed-water supply line, in which a coaxial protective sleeve (thermal sleeve) expanding with changes in temperature is disposed, which with its outer end slidably abuts the pipe socket and with its inner end is connected to a feed-water distributing ring situated in the vessel, characterised in that a pipe section is inserted between the outer end of the pipe socket and the feed-water supply line, and in that in the pipe section are disposed bellows, which with one end are tightly connected to the outer end of the expanding protective sleeve and with their other end are tightly connected to the pipe section.

2. A vessel according to claim 1, characterised in that in the bellows is disposed a pipe, which at one end outside the bellows is connected to the pipe section and the other end of which extends into the outer end of the expanding protective sleeve.

3. A vessel according to claim 1, characterised in that the pipe section is extended opposite the pipe socket and at both its ends is provided with hollow conical parts, the tapered ends of which are adapted to the dimensions of the feed-water supply line and the end of the pipe socket respectively.

* * * * *